US008761962B2

(12) United States Patent
Seok

(10) Patent No.: US 8,761,962 B2
(45) Date of Patent: Jun. 24, 2014

(54) SYSTEM FOR CONTROLLING AN IN-VEHICLE DEVICE USING AUGMENTED REALITY AND METHOD THEREOF

(75) Inventor: Dong Cheol Seok, Seoul (KR)

(73) Assignee: Hyundai Motor Company, Seoul (KR)

( * ) Notice: Subject to any disclaimer, the term of this patent is extended or adjusted under 35 U.S.C. 154(b) by 629 days.

(21) Appl. No.: 12/955,267

(22) Filed: Nov. 29, 2010

(65) Prior Publication Data

US 2012/0065814 A1 Mar. 15, 2012

(30) Foreign Application Priority Data

Sep. 13, 2010 (KR) ........................ 10-2010-0089436

(51) Int. Cl.
*G06K 9/46* (2006.01)
*G06F 17/00* (2006.01)
*G06F 7/00* (2006.01)

(52) U.S. Cl.
USPC ................. 701/2; 701/36; 382/104; 382/181; 382/190

(58) Field of Classification Search
USPC ........... 345/156; 382/104, 181, 190; 701/2, 1, 701/36, 48; 340/426.13, 426.14, 426.17, 340/426.16, 425.13; 700/245, 264; 715/771
See application file for complete search history.

(56) References Cited

U.S. PATENT DOCUMENTS

| 6,148,212 | A  | * | 11/2000 | Park et al. ................... 455/456.1 |
| 6,853,841 | B1 | * | 2/2005  | St. Pierre ........................ 455/420 |
| 7,707,073 | B2 |   | 4/2010  | Bloebaum et al. |
| 7,899,243 | B2 | * | 3/2011  | Boncyk et al. ................. 382/165 |
| 8,225,226 | B2 | * | 7/2012  | Skourup et al. ................ 715/771 |
| 8,345,925 | B2 | * | 1/2013  | Fukuchi et al. ............... 382/103 |
| 2002/0046368 | A1 |  | 4/2002  | Friedrich et al. |
| 2004/0113885 | A1 |  | 6/2004  | Genc et al. |
| 2006/0241792 | A1 | * | 10/2006 | Pretlove et al. ................. 700/83 |
| 2007/0285809 | A1 | * | 12/2007 | Takahashi ..................... 359/851 |
| 2008/0048829 | A1 | * | 2/2008  | Nakajima et al. ............ 340/5.72 |
| 2008/0082208 | A1 | * | 4/2008  | Hong et al. .................... 700/245 |
| 2008/0122595 | A1 | * | 5/2008  | Yamamichi et al. ..... 340/426.16 |
| 2009/0273561 | A1 | * | 11/2009 | Matsumoto ................... 345/156 |
| 2013/0170710 | A1 | * | 7/2013  | Kuoch et al. ................. 382/104 |

FOREIGN PATENT DOCUMENTS

| EP | 1739572 A1 | 1/2007 |
| JP | 2006-256373 A | 9/2006 |
| KR | 10-2005-0108342 | 11/2005 |
| KR | 10-2006-0099989 A | 9/2006 |
| KR | 10-2007-0019849 | 2/2007 |
| KR | 10-2007-0060957 A | 6/2007 |
| KR | 10-2010-0000189 | 1/2010 |
| KR | 10-2010-0036900 A | 4/2010 |

OTHER PUBLICATIONS

Lee, Jungmin et al., "Vision-Based User Interface for Home Network Environment," Hanyang University, Samsung Electronics, vol. 30, No. 2 (2003) pp. 451-453.

* cited by examiner

*Primary Examiner* — Christine Behncke
(74) *Attorney, Agent, or Firm* — Edwards Wildman Palmer LLP; Peter F. Corless

(57) ABSTRACT

Provided are a system and method of controlling an in-vehicle device using augmented reality. A system for controlling an in-vehicle device using augmented reality includes a mobile device configured to identify a vehicle object unit as an image and receive a vehicle control command through implementation of the augmented reality of the image, and a driving control unit configured to transmit a vehicle type information to the mobile device and, upon receiving a command signal from the mobile device, to control the in-vehicle device that corresponds to the command signal. Accordingly, by remotely controlling an in-vehicle device by using augmented reality of a mobile device, user convenience may be improved.

17 Claims, 5 Drawing Sheets

SYSTEM FOR CONTROLLING AN IN-VEHICLE DEVICE USING AUGMENTED REALITY AND METHOD THEREOF

CROSS-REFERENCES TO RELATED APPLICATIONS

This application claims priority to Korean patent application number 10-2010-0089436, filed on Sep. 13, 2010, the disclosure of which is incorporated by reference in its entirety.

BACKGROUND OF THE INVENTION

1. Field of the Invention

The present invention generally relates to a system for controlling an in-vehicle device using augmented reality, and more particularly to a technique to control an in-vehicle device with a mobile device, by using augmented reality.

2. Description of the Related Art

Generally, operation buttons for, for example, an air conditioner, an audio, a navigation system, a radio, or a digital multimedia broadcasting (DMB) are positioned at a center fascia within a vehicle, namely, between a driver's seat and a passenger's seat.

Therefore, it is difficult for a passenger in a back seat to manipulate the operation buttons of a vehicle, for example, the air conditioner, the audio, or the navigation system. Further, if the passenger in the back seat leans forward to reach an operation button in the center fascia of the vehicle, it can lead to an accident if, for example, a sudden acceleration of the vehicle results or if the vehicle come to a sudden stop.

SUMMARY OF THE INVENTION

The present invention generally enables and provides remote control of an in-vehicle device. In particular, the present invention provides a system and method for remotely controlling an in-vehicle device by using augmented reality of a mobile device.

According to one aspect of the present invention, a system is provided for controlling an in-vehicle device using augmented reality, wherein the system includes a mobile device configured to identify a vehicle object unit as an image, and to receive a vehicle control command through implementation of the augmented reality of the image; and a driving control unit configured to transmit vehicle type information to the mobile device and, upon receiving a command signal from the mobile device, to control the in-vehicle device that corresponds to the command signal.

In certain embodiments, the mobile device includes a camera configured to capture an image of the vehicle object unit. A storage unit may further be provided and configured to store an image pattern information of the vehicle object unit and the vehicle type information. A control unit may further be provided and configured to enter into a vehicle remote control mode and control transmission of the vehicle control command to the driving control unit. For example, in one embodiment a control unit is configured such that upon comparison of the image pattern information stored in the storage unit and a pattern information of the captured image, if the patterns match, the control unit enters into a vehicle remote control mode, provides an icon or the like for the user to provide an input of a command, and if the vehicle control command is inputted (e.g. through an icon), to control transmission of the vehicle control command to the driving control unit.

In certain embodiments, when the image of the vehicle object unit is captured, the control unit may further be configured to divide the captured image of the vehicle object unit into a reference area and a non-reference area according to the vehicle type information. The control unit can then compare the image pattern information stored in the storage unit with the pattern information of the captured image in the reference area.

In one preferred embodiment, when the vehicle object unit is a center fascia of a vehicle, the control unit may determine that an air conditioner grill area is the reference area.

In various embodiments, the in-vehicle device may include, but is not limited to, an air conditioner, an audio unit, a radio, a digital multimedia broadcasting (DMB), a navigation unit, an interior lighting device and a window.

In various embodiments, when the mobile device is within a predetermined distance from a vehicle, the driving control unit may transmit the vehicle type information of the vehicle to the mobile device.

In various embodiments, when the mobile device sends a request for the vehicle type information to a vehicle, the driving control unit may transmit the vehicle type information of the vehicle to the mobile device.

In certain embodiments, the mobile device may include a camera configured to capture an image of the vehicle object unit. A storage unit may further be provided and configured to store image pattern information corresponding to the vehicle object unit, and to store coordinate information of an operation button positioned on the image; A control unit may further be provided and configured to control transmission of a vehicle control command from the mobile device to the driving control unit. For example, in certain embodiments, the control unit is configured to compare the image pattern information stored in the storage unit to a pattern information of the captured image, and if the patters match, to enter into a vehicle remote control mode. In certain embodiments, the control unit can be configured such that if the operation button on the captured image is touched on the mobile device, to identify the vehicle control command by comparing a coordinate information of a touched position with the coordinate information stored in the storage unit, to thereby control transmission of the vehicle control command from the mobile unit to the driving control unit.

According to another aspect of the present invention, a method of controlling an in-vehicle device using augmented reality is provided. In one embodiment, the method includes pre-storing in a mobile device image pattern information of a center fascia by a vehicle type; receiving, by the mobile device, the vehicle type information from a vehicle; capturing an image of a vehicle object unit, wherein the image is provided on a screen of the mobile device; comparing pattern information of the image captured by the mobile device (that varies according to the vehicle type information) with the image pattern information pre-stored in the mobile device (e.g. in a storage unit of the mobile device); entering, by the mobile device, into a vehicle remote control mode if the pattern information of the captured image matches the pre-stored image pattern information; and displaying, by the mobile device, a device control command icon of the vehicle on the screen of the mobile device.

In one embodiment, the step of receiving the vehicle type information may include transmitting, by the vehicle, the vehicle type information of the vehicle to the mobile device when the mobile device approaches within a predetermined distance from the vehicle.

In one embodiment, the step of receiving the vehicle type information may include receiving, by the mobile device, the vehicle type information of the vehicle upon sending a request to the vehicle, e.g. via the mobile device, for the vehicle type information.

In one embodiment, the step of comparing the patterns may include dividing the captured image into a reference area and a non-reference area based on the vehicle type information, and comparing a pattern information of the reference area of the captured image with the pre-stored image pattern information.

In certain embodiments, for example, if the vehicle object unit is the center fascia, an air conditioner grill unit may be the reference area, and a central portion may be the non-reference area.

In some embodiments, the method may further include, when the device control command icon of the vehicle is selected, wirelessly transmitting/receiving a command signal corresponding to the icon to the driving control unit, and controlling the in-vehicle device according to the command signal received by the driving control unit.

In various embodiments, the in-vehicle device may be selected from an air conditioner, an audio unit, a radio, a digital multimedia broadcasting (DMB), a navigation unit, an interior lighting device and a window.

According to still another aspect of the present invention, a method is provided for controlling an in-vehicle device using augmented reality. In particular, the method includes pre-storing in a mobile device image pattern information of a vehicle object unit by a vehicle type, and a coordinate information of an image of the vehicle object unit; receiving, by the mobile device, the vehicle type information from a vehicle; capturing an image of the vehicle object unit, wherein the image is provided on a screen of the mobile device; comparing pattern information of the image captured by the mobile device (that varies according to the vehicle type) with the pre-stored image pattern information; if the pattern information of the captured image matches the pre-stored image pattern information, entering, by the mobile device, into a vehicle remote control mode; receiving an in-vehicle device control command through contact or manipulation (e.g. a touch) of the image of the vehicle object unit displayed on the mobile device screen; and transmitting the in-vehicle device control command to the vehicle.

In one embodiment, the step of receiving the vehicle type information may include transmitting, by the vehicle, the vehicle type information of the vehicle to the mobile device when the mobile device approaches within a predetermined distance from the vehicle.

In one embodiment, the step of receiving of the vehicle type information may include receiving, by the mobile device, the vehicle type information of the vehicle upon sending a request to the vehicle for the vehicle type information.

In one embodiment, the step of comparing the pattern information may include dividing the captured image into a reference area and a non-reference area based on the vehicle type information, and comparing the pattern information of the reference area of the captured image with the pre-stored image pattern information.

In one embodiment, the step of receiving of the in-vehicle device control command may include, when the image of the vehicle object unit displayed on the screen of the mobile device is touched, comparing a coordinate information of a touched position with the pre-stored coordinate information of the image of the vehicle object unit, to identify a vehicle control command.

The present invention, thus provides for remote controlling an in-vehicle device by using augmented reality of a mobile device, thereby improving user convenience.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

A system for controlling an in-vehicle device using augmented reality according to the present invention will now be described more fully with reference to the accompanying drawings FIGS. 1 through 6 which illustrate some exemplary embodiments of the present invention.

Augmented reality is a user interface technique that overlays a virtual computer-generated image precisely corresponding to a user's view of a real world image. By using augmented reality, a user may have an enhanced perception and experience of reality.

Figure 1:
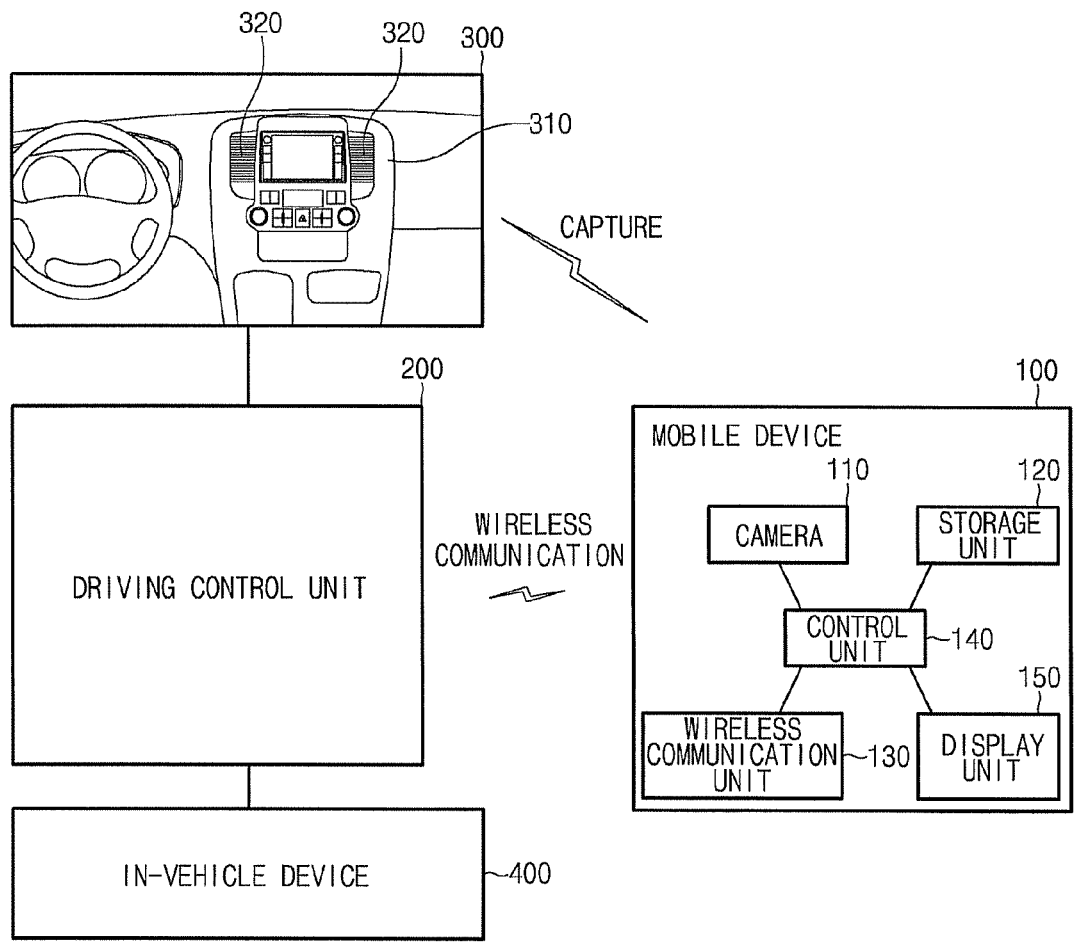
FIG. 1 is a schematic diagram illustrating a system for controlling an in-vehicle device using augmented reality according to an embodiment of the present invention.

FIG. 1 is a schematic diagram illustrating a system for controlling an in-vehicle device using augmented reality according to an embodiment of the present invention.

As shown in FIG. 1, the system may include a mobile device 100, a driving control unit 200, a vehicle object unit 300 and an in-vehicle device 400.

In accordance with an exemplary embodiment, the mobile device 100 captures an image of the vehicle object unit 300, receives a vehicle control command through the image, and transmit the vehicle control command to the driving control unit 200. Preferably, the mobile device 100 includes a camera 100, a storage unit 120, a wireless communication unit 130, a control unit 140 and a display unit 150. In certain embodiments, the mobile device 100 may include a terminal, such as a smart phone, in which various applications can be implemented.

The camera 110 captures the image of the vehicle object unit 300. In certain aspects, the camera 110 may not photograph an image but, rather, may remain in a turned-on state such that the image as viewed through the camera 110 may be shown on the display unit 150 of the mobile device 100.

The storage unit 120 may be configured to store a vehicle type information received from the vehicle's driving control unit 200 the storage unit 120 may also be configured to store pattern information and coordinate information of the image of the vehicle object unit 300 by the vehicle type. For example, if the vehicle object unit 300 is a center fascia, the image pattern information of the vehicle object unit 300 may indicate pattern information of an air conditioner grill.

The wireless communication unit 130 is configured to wirelessly communicate with the driving control unit 200 through, for example, Bluetooth or other known means.

According to an embodiment of the present invention, the control unit 140 may be configured to divide a captured image (e.g. an image captured from the camera 110) of the vehicle object unit 300 into a reference area 320 and a non-reference area 330 based on the vehicle type information. Further, if it is determined that the image pattern information (by the vehicle type) of the vehicle object unit 300 stored in the storage unit 120 matches the pattern information of the reference area of the image captured by the camera 110, then the control unit 140 is configured such that the vehicle remote control mode is entered, and an icon is provided on the mobile device for allowing an input of an in-vehicle device control command. Further, upon receiving the in-vehicle device control command, the control unit 140 can be further configured to control transmission of the in-vehicle control command to the driving control unit 200.

In certain embodiments, when an operation button positioned on the captured image is touched, the control unit 140 can be configured to detect coordinate information of a touched area, and compare the coordinate information of the touched area with a pre-stored coordinate information of the image to identify a corresponding command of the operation button. For example, in a center fascia image of a vehicle type 'Sonata,' if a coordinate of an audio button is stored as (A, B) and a coordinate of a digital multimedia broadcasting (DMB) button is stored as (C, D), and a coordinate of an area touched by a user on the captured image (on the mobile device) corresponds to (C, D), it is determined that the user wishes to operate the DMB button and a DMB button operation command signal is transmitted to the driving control unit 200.

According to preferred embodiments, when the driving control unit 200 receives a command signal from the mobile device 100, the in-vehicle device 400 is controlled according to the command signal. In accordance with some embodiments, when the mobile device 100 approaches within a predetermined distance from the vehicle, the driving control unit 200 transmits the vehicle type information of the vehicle to the mobile device 100.

As shown in FIG. 1, the vehicle object unit 300 may include an object such as a center fascia 310 to be controlled remotely.

According to embodiments of the present invention, the in-vehicle device 400 can include, but is not limited to, for example, an air conditioner, an audio unit, a radio, a DMB, an interior lighting device, and a window up/down module.

Figure 2:
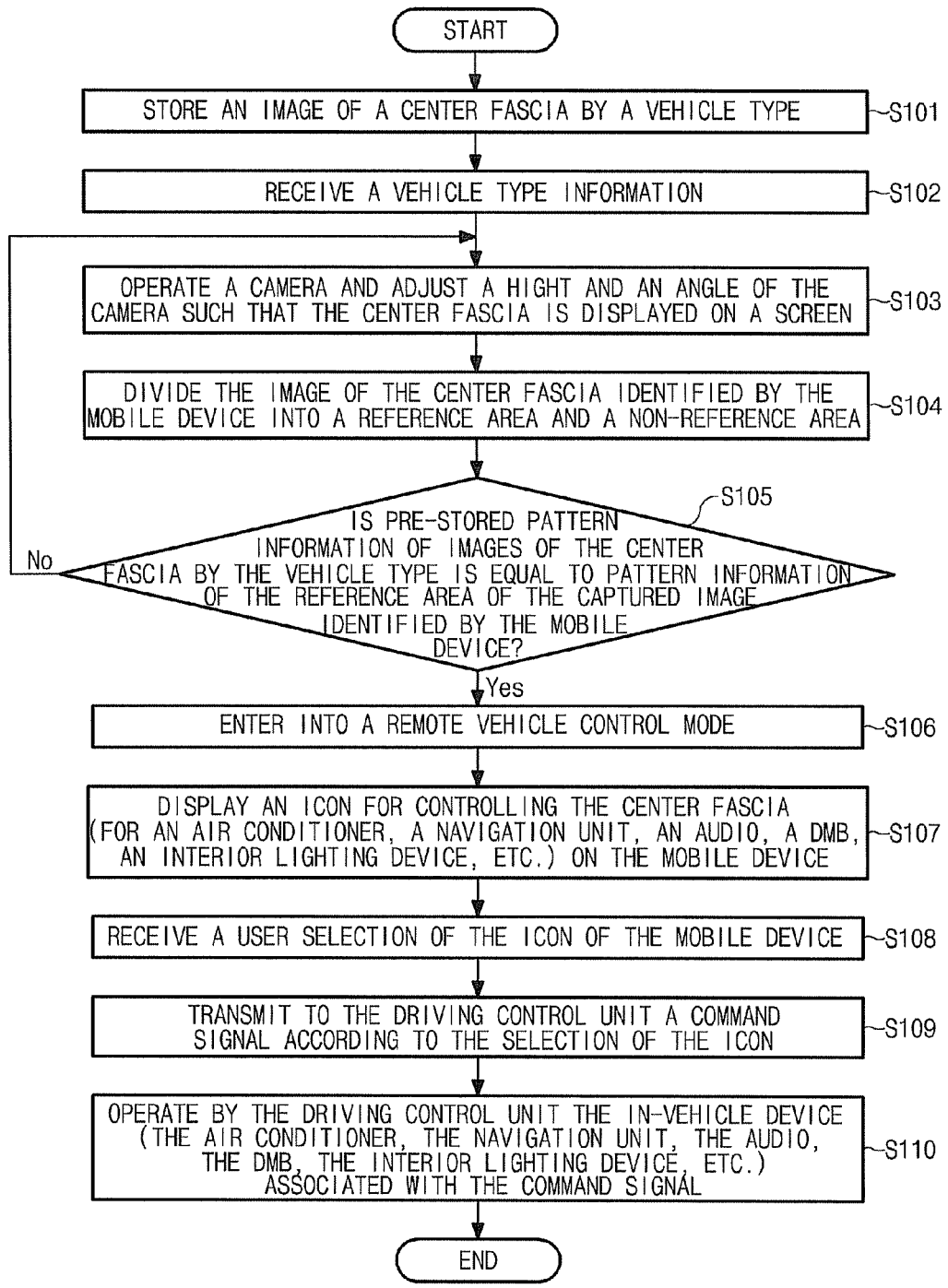
FIG. 2 is a flowchart diagram illustrating a method of controlling an in-vehicle device using augmented reality according to an embodiment of the present invention.
Figure 3:
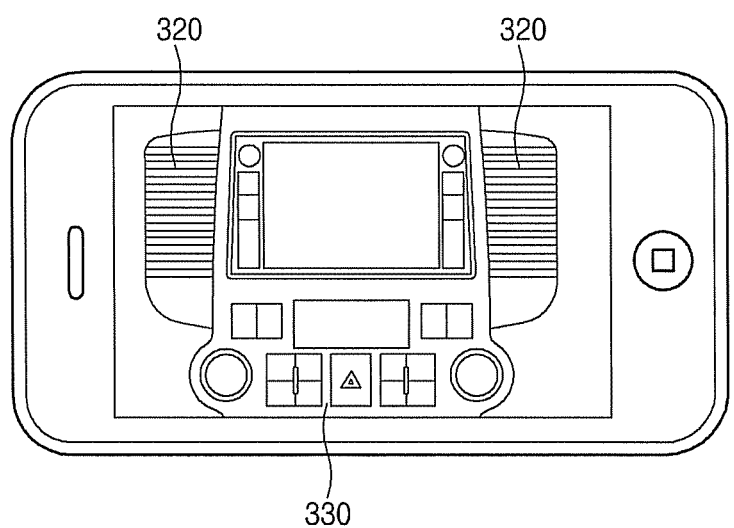
FIG. 3 illustrates an embodiment of the present invention wherein an image of a center fascia is captured on a screen of a mobile device.

Hereinafter, with reference to FIG. 2, a method of controlling an in-vehicle device using augmented reality according to an embodiment of the present invention will be described in further detail. In particular, FIG. 2 shows an example of controlling the center fascia 310 of the vehicle. However, it should be noted that the present invention can also apply to various other vehicle controls such as, but not limited to, for example, opening and closing of a door or a window of the vehicle.

As shown in FIG. 2, first an image pattern information of a center fascia, by the vehicle type, is stored in the storage unit 120 of the mobile device 100 (S101). For example, the mobile device 100 may download and store beforehand the image pattern information of the center fascia by the vehicle type, e.g. through a telematics center (not shown) or a vehicle related website.

Figure 4:
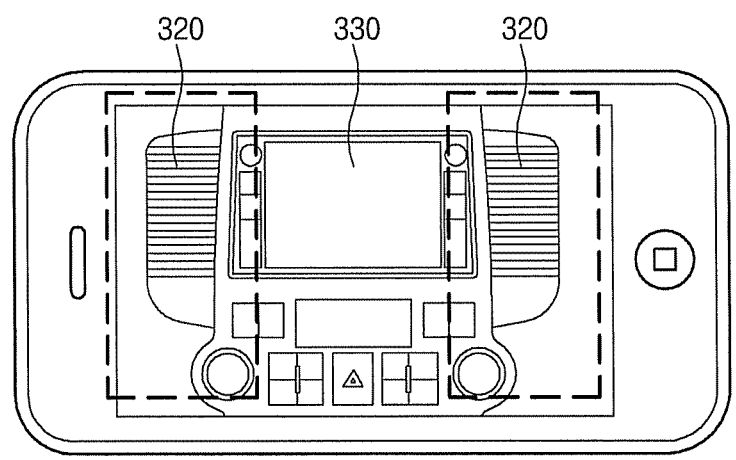
FIG. 4 illustrates an embodiment of the present invention wherein the image of the center fascia of FIG. 3 is divided into a reference area and a non-reference area.
Figure 5:
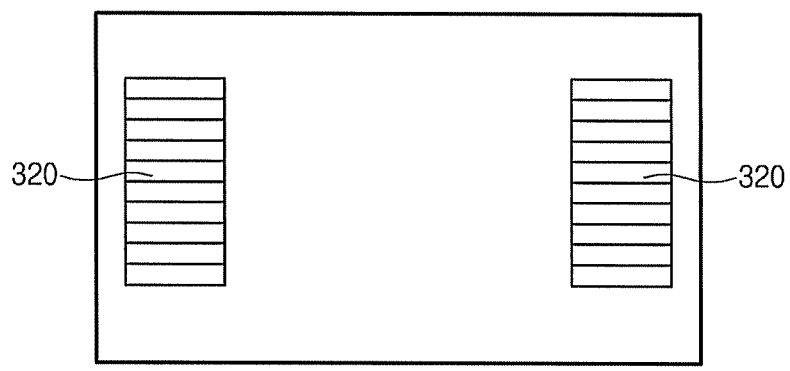
FIGS. 5 and 6 illustrate an embodiment of the present invention wherein image pattern information of an air conditioner grill by a vehicle type is stored by the mobile device.
Figure 6:
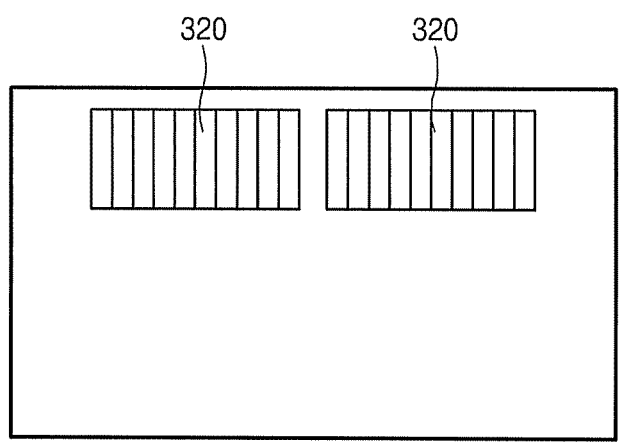

In certain embodiments, the image of the center fascia by the vehicle type (such as that shown in FIG. 3) can be divided such that, as illustrated in FIG. 4 for example, air conditioner grill units on both sides are determined as the reference area 320 and a central area is determined as the non-reference area 330. Each reference area 320 may be patterned and stored according to the vehicle type, as illustrated for example in FIGS. 5 and 6. FIG. 5 shows one example of a pattern image when the air conditioner grill units are placed on both ends of the center fascia, and FIG. 6 shows one example of a pattern image when the air conditioner grill units are placed side by side on a top portion of the center fascia.

Next, the mobile device 100 and the vehicle perform wireless communication therebetween so that the mobile device 100 receives the vehicle type information from the driving control unit 200 of the vehicle (S102). In some embodiments, a method may be provided wherein the mobile device 100 receives the vehicle type information when the driving control unit 200 detects that the mobile device 100 is within a predetermined distance from the vehicle, and, thus, transmits the vehicle type information to the mobile device 100. In some embodiments, the method may be implemented such that, when a user is in the vehicle and the mobile device 100 sends a request for the vehicle type information to the vehicle (for example, by operating a vehicle remote control application), the mobile device 100 sends a request for the vehicle type information to the driving control unit 200, and the driving control unit 200 transmits the vehicle type information to the mobile device 100.

Next, as shown in FIG. 2, when the camera 110 of the mobile device 100 is operated by a user such that the center fascia 310 is provided on the screen of the mobile device 100 (S103), the control unit 140 divides the image of the center fascia 310 shown on the screen into the reference area 320 and the non-reference area 330 (S104). For example, if the vehicle type is Sonata, the air conditioner grills are positioned on both ends as shown in FIG. 5, and therefore, both end portions of the image of the center fascia displayed on the screen are designated as the reference area 320 and a central portion is designated as the non-reference area 330. Next, as shown in FIG. 2, the control unit 140 compares pattern information of the reference area 320 of a center fascia image shown on the screen with the image pattern information of the center fascia by the vehicle type that is pre-stored in S101 (S105).

If a comparison result of S105 indicates a mismatch, the height and/or angle of the camera 110 are adjusted to place the air conditioner grill of the center fascia on the screen of the mobile device. If the comparison result of S105 is a match, the control unit 140 enters into the vehicle remote control mode (S106).

Next, the control unit 140 controls a center fascia control icon to appear on the display unit 150 of the mobile device 100 (S107). For example, the center fascia control icon may include an icon associated with a vehicle control, for example, the air conditioner, the navigation unit, the audio unit, the DMB, the interior lighting device of a vehicle, and the like.

Next, when a user selects the icon shown on the display unit 150 of the mobile device 100 (S108), the control unit 140 transmits a command signal corresponding to the selected icon to the driving control unit 200 through the wireless communication unit 130 (S109). In certain preferred embodiments, the wireless communication unit 130 performs Bluetooth communication.

Next, the driving control unit 200 controls the in-vehicle device 400 (for example, the air conditioner, the audio unit, the navigation unit, the DMB, or the interior lighting device of a vehicle) according to the command signal received from the mobile device 100 (S110).

In the described embodiments of the present invention, it is specified that the pattern image is determined based on a shape of an air conditioner grill, of which shape and/or size generally vary depending on the vehicle type. However, it should be noted that the pattern image may be determined based on a shape and/or size of any other operation button of a vehicle for example, an audio control button or a radio control button of the center fascia.

In addition, the use of the center fascia control icon is described in particular in the embodiments of the present invention. However, it should be noted that in a touch screen setting, a user may directly touch the central portion 330 of the center fascia image information to input a command. Thus, for example, coordinate information of each operation button of the central portion 330 of the image information of the center fascia by the vehicle type may be pre-stored in the storage unit 120. Preferably, if the operation button of the central portion 330 of the center fascia image information is touched by the user, a corresponding command signal is identified by the control unit 140 according to the coordinate information of a position touched and transmitted to the driving control unit 200.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A system for controlling an in-vehicle device using augmented reality, the system comprising:
 a mobile device configured to identify a vehicle object unit as an image and receive a vehicle control command through implementation of the augmented reality of the image; and
 a driving control unit configured to transmit vehicle type information to the mobile device and, upon receiving a command signal from the mobile device, control an in-vehicle device that corresponds to the command signal,
 wherein the mobile device includes,
 a camera configured to capture an image of the vehicle object unit;
 a storage unit configured to store image pattern information of the vehicle object unit, and the vehicle type information; and
 a control unit configured to, if the image pattern information stored in the storage unit matches pattern information of the captured image, enter into a vehicle remote control mode, provide an icon for an input of a command, and, if the vehicle control command is inputted through the icon, control transmission of the vehicle control command to the driving control unit,
 wherein, when the image of the vehicle object unit is captured, the control unit is configured to divide the captured image of the vehicle object unit into a reference area and a non-reference area according to the vehicle type information, and to compare the image pattern information stored in the storage unit with pattern information of the reference area of the captured image, and
 wherein, when the vehicle object unit is a center fascia of a vehicle, the control unit is configured to determine an air conditioner grill area as the reference area.

2. The system according to claim 1, wherein the in-vehicle device is an air conditioner, an audio, a radio, a digital multimedia broadcasting (DMB), a navigation unit, an interior lighting device or a window.

3. The system according to claim 1, wherein, when the mobile device sends a request for the vehicle type information to a vehicle, the driving control unit is configured to transmit the vehicle type information of the vehicle to the mobile device.

4. The system according to claim 1, wherein, when the mobile device approaches within a predetermined distance from the vehicle, the driving control unit is configured to transmit the vehicle type information of the vehicle to the mobile device.

5. A system for controlling an in-vehicle device using augmented reality, the system comprising:
 a mobile device configured to identify a vehicle object unit as an image and receive a vehicle control command through implementation of the augmented reality of the image; and
 a driving control unit configured to transmit vehicle type information to the mobile device and, upon receiving a command signal from the mobile device, control an in-vehicle device that corresponds to the command signal,
 wherein the mobile device includes,
 a camera configured to capture an image of the vehicle object unit;
 a storage unit configured to store image pattern information corresponding to the vehicle object unit and coordinate information of an operation button positioned on the image; and
 a control unit configured to, if the image pattern information stored in the storage unit matches pattern information of the captured image, enter into a vehicle remote control mode, and, if the operation button on the captured image is touched, to identify the vehicle control command by comparing coordinate information of a touched position with coordinate information stored in the storage unit so as to control transmission of the vehicle control command to the driving control unit.

6. A method of controlling an in-vehicle device using augmented reality, the method comprising:
 pre-storing in a mobile device image pattern information of a center fascia by a vehicle type;
 receiving, by the mobile device, vehicle type information from the vehicle;
 capturing an image of a vehicle object unit that is placed on a screen of the mobile device;
 comparing pattern information of the image captured by the mobile device that varies according to the vehicle type information with the image pattern information pre-stored in the storage unit;
 entering into a vehicle remote control mode with the mobile device when the pattern information of the captured image matches the pre-stored image pattern information; and
 displaying on the screen of the mobile device a device control command icon of the vehicle.

7. The method according to claim 6, wherein the step of receiving the vehicle type information includes transmitting, by the vehicle, the vehicle type information of the vehicle to the mobile device when the mobile device is within a predetermined distance from the vehicle.

8. The method according to claim 6, wherein the step of receiving the vehicle type information includes receiving, by the mobile device, the vehicle type information of the vehicle upon sending a request for the vehicle type information to the vehicle.

9. The method according to claim 6, wherein, the step of comparing includes, dividing the captured image into a reference area and a non-reference area based on the vehicle type information; and comparing pattern information of the reference area of the captured image with the pre-stored image pattern information.

10. The method according to claim 9, wherein, if the vehicle object unit is the center fascia, an air conditioner grill unit is the reference area and a central portion is the non-reference area.

11. The method according to claim 9, wherein the in-vehicle device is an air conditioner, an audio, a radio, a digital multimedia broadcasting (DMB), a navigation unit, an interior lighting device or a window.

12. The method according to claim 9, wherein the step of receiving the in-vehicle device control command includes comparing, when the image of the vehicle object unit displayed on the screen of the mobile device is touched, coordinate information of a touched position with the pre-stored coordinate information of the image of the vehicle object unit, to identify a vehicle control command.

13. The method according to claim 6, further comprising:
wirelessly transmitting and receiving, when the device control command icon of the vehicle is selected, a command signal corresponding to the icon to the driving control unit; and
controlling the in-vehicle device according to the command signal received by the driving control unit.

14. The method according to claim 6, wherein, the step of comparing pattern information includes,
dividing the captured image into a reference area and a non-reference area based on the vehicle type information; and comparing pattern information of the reference area of the captured image with the pre-stored image pattern information.

15. A method of controlling an in-vehicle device using augmented reality, the method comprising:
pre-storing in a mobile device image pattern information of a vehicle object unit by a vehicle type, and coordinate information of an image of the vehicle object unit;
receiving, by the mobile device, the vehicle type information from the vehicle;
capturing the image of the vehicle object unit that is placed on a screen of the mobile device;
comparing pattern information of the image captured by the mobile device that varies according to the vehicle type with the pre-stored image pattern information;
entering, by the mobile device, into a vehicle remote control mode when the pattern information of the captured image matches the pre-stored image pattern information;
receiving an in-vehicle device control command through a touch on the image displayed on the screen of the mobile device; and
transmitting the in-vehicle device control command to the vehicle.

16. The method according to claim 15, wherein the step of receiving the vehicle type information includes transmitting, by the vehicle, the vehicle type information of the vehicle to the mobile device when the mobile device is within a predetermined distance from the vehicle.

17. The method according to claim 15, wherein the step of receiving the vehicle type information includes receiving, by the mobile device, the vehicle type information of the vehicle upon sending a request for the vehicle type information to the vehicle.

* * * * *